United States Patent
Sadilek et al.

(10) Patent No.: US 11,359,470 B2
(45) Date of Patent: Jun. 14, 2022

(54) SYSTEMS AND METHODS FOR OPTIMIZING AN EFFICIENCY OF A VARIABLE FREQUENCY DRIVE

(71) Applicant: Baker Hughes Oilfield Operations, LLC, Houston, TX (US)

(72) Inventors: Tomas Sadilek, Schenectady, NY (US); Nathaniel Benedict Hawes, Ballston Spa, NY (US); David Allan Torrey, Ballston Spa, NY (US); Di Pan, Schenectady, NY (US); Kum Kang Huh, Schenectady, NY (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 1246 days.

(21) Appl. No.: 15/282,321

(22) Filed: Sep. 30, 2016

(65) Prior Publication Data
US 2018/0094512 A1 Apr. 5, 2018

(51) Int. Cl.
*H02P 6/06* (2006.01)
*E21B 43/12* (2006.01)
(Continued)

(52) U.S. Cl.
CPC ......... *E21B 43/128* (2013.01); *E21B 47/008* (2020.05); *H02P 9/14* (2013.01);
(Continued)

(58) Field of Classification Search
CPC .... E21B 43/128; E21B 47/0007; E21B 47/06; H02P 25/022; H02P 27/06; H02P 9/14
(Continued)

(56) References Cited

U.S. PATENT DOCUMENTS 6,043,995 A * 3/2000 Leuthen ................ E21B 43/128
363/37
6,242,884 B1 6/2001 Lipo et al.
(Continued)

FOREIGN PATENT DOCUMENTS

CN 2739162 Y 11/2005
CN 103607155 B 1/2016
(Continued)

OTHER PUBLICATIONS

U.S. Appl. No. 14/946,513, filed Sep. 11, 2015, Hawes et al.
(Continued)

*Primary Examiner* — Bickey Dhakal
*Assistant Examiner* — Gabriel Agared
(74) *Attorney, Agent, or Firm* — Crowe & Dunlevy, P.C.

(57) ABSTRACT

A system including a control system is provided. The control system includes a main drive that receives power from a power source and outputs a variable frequency and a variable amplitude AC voltage. The control system also includes a controller to interface with the main drive and an electric machine. The controller receives one or more electrical signals associated with an operating condition of the electric machine from one or more sensors disposed between the electric machine and the main drive. The controller determines correction information based on the received electrical signals and based on a desired operating condition of the electric machine. The controller transmits the correction information to the main drive. The correction information corresponds to a rotor position of the electric machine or operating commands configured to implement the desired operating condition of the electric machine.

12 Claims, 8 Drawing Sheets

(51) Int. Cl.
*H02P 9/14* (2006.01)
*H02P 27/06* (2006.01)
*H02P 27/04* (2016.01)
*H02P 21/20* (2016.01)
*H02P 25/024* (2016.01)
*E21B 47/008* (2012.01)

(52) U.S. Cl.
CPC ............ *H02P 21/20* (2016.02); *H02P 25/024* (2016.02); *H02P 27/04* (2013.01); *H02P 27/06* (2013.01)

(58) Field of Classification Search
USPC .................................................... 318/400.06
See application file for complete search history.

(56) References Cited

U.S. PATENT DOCUMENTS

| | | | |
|---|---|---|---|
| 6,481,973 B1* | 11/2002 | Struthers | F04D 7/045 |
| | | | 417/36 |
| 6,856,109 B2 | 2/2005 | Ho | |
| 7,202,619 B1 | 4/2007 | Fisher | |
| 9,057,256 B2 | 6/2015 | Ige et al. | |
| 9,209,735 B2 | 12/2015 | Kanchan | |
| 2006/0266913 A1* | 11/2006 | McCoy | F04D 15/0088 |
| | | | 248/550 |
| 2007/0263331 A1* | 11/2007 | Leuthen | H02H 7/1222 |
| | | | 361/78 |
| 2008/0247880 A1* | 10/2008 | Leuthen | E21B 43/128 |
| | | | 417/44.11 |
| 2010/0301790 A1* | 12/2010 | Liu | H02P 6/18 |
| | | | 318/400.33 |
| 2011/0050145 A1* | 3/2011 | Plitt | E21B 47/0007 |
| | | | 318/490 |
| 2013/0175030 A1* | 7/2013 | Ige | G05B 15/02 |
| | | | 166/250.15 |
| 2014/0158320 A1 | 6/2014 | Archer et al. | |
| 2014/0246997 A1 | 9/2014 | Suzuki | |
| 2015/0078917 A1* | 3/2015 | Torrey | F04D 15/0066 |
| | | | 417/42 |
| 2015/0115850 A1 | 4/2015 | Laursen | |
| 2016/0160862 A1* | 6/2016 | Torrey | F04D 7/02 |
| | | | 417/44.1 |
| 2016/0248363 A1* | 8/2016 | Wu | H02P 27/047 |
| 2016/0276970 A1* | 9/2016 | Hawes | H02P 6/183 |

FOREIGN PATENT DOCUMENTS

| | | |
|---|---|---|
| EP | 2571160 A1 | 3/2013 |
| WO | 2015170991 A1 | 11/2015 |
| WO | 2017087737 A1 | 5/2017 |

OTHER PUBLICATIONS

U.S. Appl. No. 14/663,691, filed Mar. 18, 2016, Hawes et al.
Huang, Shoudao, et al.; "Maximum torque per ampere and flux-weakening control for PMSM based on curve fitting", 2010 IEEE Vehicle Power and Propulsion Conference, pp. 1-5, Sep. 1-3, 2010, Lille.
Rabbi, S.F., et al.; "Equivalent Circuit Modeling of a Hysteresis Interior Permanent Magnet Motor for Electric Submersible Pumps.", IEEE Transactions on Magnetics, vol. PP, Issue: 99, pp. 1, Feb. 3, 2016.
Examination Report No. 1 for Standard Patent Application; Application No. 2017337129; Australian Government; IP Australia; dated Feb. 3, 2020.
Written Opinion of the International Searching Authority; PCT/US2017/054742; dated Jan. 3, 2018.
Office Action for Canadian Patent Application Serial No. 3,038,907; Canadian Intellectual Property Office, dated May 5, 2020.

* cited by examiner

SYSTEMS AND METHODS FOR OPTIMIZING AN EFFICIENCY OF A VARIABLE FREQUENCY DRIVE

BACKGROUND

The subject matter disclosed herein relates to variable frequency drives (VFDs) for driving electric machines, and more specifically to systems and methods for optimizing efficiency of VFDs used to drive electric machines.

In typical oil and gas drilling applications a well bore is drilled to reach a reservoir. The well bore may include multiple changes in direction and may have sections that are vertical, slanted, or horizontal. A well bore casing is inserted into the well bore to provide structure and support for the well bore. The oil, gas, or other fluid deposit is then pumped out of the reservoir, through the well bore casing, and to the surface, where it is collected. One way to pump the fluid from the reservoir to the surface is with an electrical submersible pump (ESP), which is driven by an electric motor (e.g., an induction motor or a permanent magnet motor) in the well bore casing.

A variety of components may be used to receive power from a power source, filter, convert and/or transform the power, and then drive the electric motor. For example, a variable frequency drive (VFD) may receive power from a power source (e.g., utility grid, batteries, a generator, etc.). The power may then pass through a filter and a step up transformer to generate a stepped up voltage, and the stepped up voltage may be provided to the electric motor via a cable that passes through the well bore. As a further example, in certain situations, a main VFD may receive power from a power source. The power may then pass through a filter, a step up transformer, and a secondary VFD. The secondary VFD may provide a supplemental voltage in addition to the stepped up voltage when the operational values of the electric motor exceed a threshold value.

In certain situations, the motor may not operate as intended or in an efficient manner due to various external factors. In other words, various external factors may prevent the motor from supplying a maximum amount of power for a given amount of current supplied from the VFD. Accordingly, in certain situations, it may be desirable to improve the overall system efficiency by modifying information communicated to the main VFD in order to drive the motor in a desired manner. Further, in certain situations, it may be desirable to improve the overall system efficiency by utilizing the secondary VFD to deliver correction signals into the system in order to drive the motor in a desired manner.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a system including a control system is provided. The control system includes a main drive configured to receive power from a power source and output a variable voltage and variable amplitude AC voltage. The control system also includes a controller configured to interface with the main drive and an electric machine. The controller is configured to receive one or more electrical signals associated with an operating condition of the electric machine from one or more sensors disposed between the electric machine and the drive and determine correction information based on the received electrical signals and based on a desired operating condition of the electric machine. The controller is configured to transmit the correction information to the main drive, wherein the correction information corresponds to a rotor position of the electric machine or operating commands configured to implement the desired operating condition of the electric machine.

In another embodiment, a control system is provided. The control system includes a main drive configured to receive power from a power source and output a variable frequency and a variable amplitude AC voltage. The control system includes a secondary drive configured to interface with the main drive via a transformer. The secondary drive is configured to provide a supplemental voltage or current to an electric machine in addition to the variable amplitude AC voltage from the main drive. The secondary drive receives one or more electrical signals associated with an operating condition of the electric machine from one or more sensors disposed between the electric machine and the main drive and determines correction information based on the received electrical signals and based on a desired operating condition of the electric machine. The secondary drive implements the correction information corresponding to operating commands configured to implement the desired operating condition of the electric machine.

In another embodiment, a method is provided. The method includes monitoring one or more current operational values of an electric machine within an electric submersible pump (ESP) system via a control system. The method also includes receiving the one or more current operational values of the electric machine associated with an operating condition of the electric machine from one or more sensors disposed between the electric machine and the control system. The method also includes determining correction information based on the one or more current operational values of the electric machine and based on one or more desired operational values of the electric machine. The method also includes transmitting the correction information to a main drive or a secondary drive of the control system. The correction information corresponds to operating commands configured to implement a desired operating condition of the electric machine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Embodiments of the present disclosure relate to systems and methods for optimizing an efficiency of a variable frequency drive (VFD) used to drive an electric machine, such as an electric motor or a generator. Certain embodiments of the present disclosure discuss systems and methods for optimizing an efficiency of a VFD used with an electric motor; however, it should be noted that features of the present disclosure may be utilized to optimize the efficiency of a VFD that drives any electric machine (e.g., an electric motor or a generator). In particular, certain embodiments of the present disclosure relate to systems and methods for optimizing an efficiency of a variable frequency drive (VFD) used with electric submersible pumps (ESPs) within oil and gas applications. As noted above, in certain embodiments, an electric motor (e.g., an induction motor or a permanent magnet motor) is utilized to drive the ESP to pump fluid from a reservoir and to the surface, where it is collected. In particular, a main VFD may receive, filter, convert, and/or transform power received from a power source to drive the electric motor. In certain embodiments, the electric motor may not operate as intended because various external factors (such as an improperly configured VFD) may cause the motor to draw more current for a given amount of load. Indeed, the electric motor may not operate in the most efficient manner, such as along a Maximum Torque per Ampere (MTPA) curve. Accordingly, certain embodiments of the present disclosure relate to improving the overall system efficiency by modifying information communicated to the main VFD, in order to drive the electric motor operating point onto the MTPA curve. Further, certain embodiments of the present disclosure relate to improving the overall system efficiency by utilizing the secondary VFD to deliver correction signals into the system, in order to drive the motor operating point onto the MTPA curve.

Figure 1:
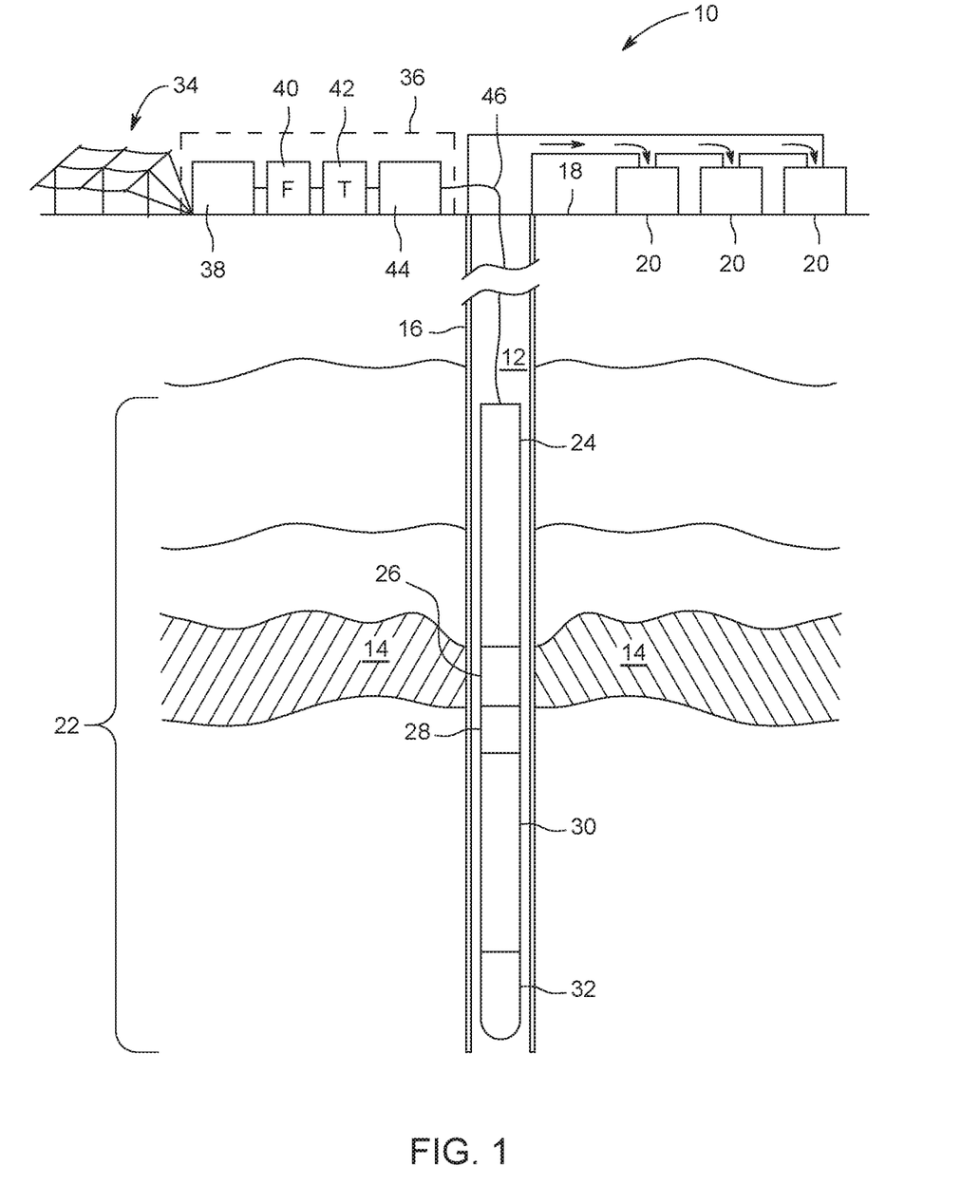
FIG. 1 is a schematic of a hydrocarbon extraction system extracting fluid from an underground reservoir in accordance with aspects of the present disclosure.

With the foregoing in mind, FIG. 1 is a schematic of a hydrocarbon extraction system (e.g., well 10) extracting fluid deposits (e.g., oil, gas, etc.) from an underground reservoir 14. As shown in FIG. 1, a well bore 12 may be drilled in the ground toward a fluid reservoir 14. Though the well bore 12 shown in FIG. 1 is a vertical well bore 12, well bores 12 may include several changes in direction and may include slanted or horizontal sections. A well bore casing 16 is typically inserted into the well bore 12 to provide support. Fluid deposits from the reservoir 14, may then be pumped to the surface 18 for collection in tanks 20, separation, and refining. Though there are many possible ways to pump fluids from an underground reservoir 14 to the surface 18, one technique is to use an electrical submersible pump (ESP), as shown in FIG. 1.

When using an ESP, an ESP assembly or system 22 is fed through the well bore casing 16 toward the reservoir 14. The ESP assembly 22 may include a pump 24, an intake 26, a sealing assembly 28, an electric motor 30, and a sensor 32. Power may be drawn from a power source 34 and provided to the electric motor 30 by an ESP control system 36. The power source 34 shown in FIG. 1 is a utility grid, but power may be provided in other ways (e.g., generator, batteries, etc.). In certain embodiments, the ESP control system 36 may include a main variable frequency drive (VFD) 38, a filter 40, a transformer 42, a secondary VFD 44, and a cable 46, as further described with respect to FIG. 2. In certain embodiments, the ESP control system 36 may include the main VFD 38, the filter 40, the transformer 42, a controller 45, and the cable 46, as further described with respect to FIG. 3. It should be understood, however, that FIG. 1 shows one embodiment, and that other embodiments may omit some elements or have additional elements.

The main VFD 38 synthesizes the variable frequency, variable amplitude, AC voltage that drives the motor. In some embodiments, the power output by the VFD may be filtered by filter 40. In the present embodiment, the filter 40 is a sine wave filter. However, in other embodiments, the filter may be a low pass filter, a band pass filter, or some other kind of filter. The power may then be stepped up or down by a transformer 42. In the present embodiment, a step up transformer is used for efficient transmission down the well bore 12 to the ESP assembly 22, however, other transformers or a plurality of transformers may be used. A secondary VFD 44 may be disposed on the high-voltage side of the transformer 42 and configured to deliver full-rated current for a short period of time (e.g., one minute or less) when the electric motor 30 requires more voltage than the transformer 42 can support. In embodiments with multiple transformers (e.g., a step up transformer 42 at the surface, and a step down transformer in the well bore 12, at the end of the cable 46, the secondary VFD 44 may be installed between the transformers or at the termination of the second transformer. Power output from the secondary VFD may be provided to the ESP assembly 22 via a cable 46 that is fed through the well bore casing 16 from the surface 18 to the ESP assembly 22. The motor 30 then draws power from the cable 46 to drive the pump 24. The motor 30 may be an induction motor, a permanent magnet motor, or any other type of electric motor.

The pump 24 may be a centrifugal pump with one or more stages. The intake 26 acts as a suction manifold, through which fluids 14 enter before proceeding to the pump 24. In some embodiments, the intake 26 may include a gas separator. A sealing assembly 28 may be disposed between the intake 26 and the motor 30. The sealing assembly protects the motor 30 from well fluids 14, transmits torque from the motor 30 to the pump 24, absorbs shaft thrust, and equalizes the pressure between the reservoir 14 and the motor 30. Additionally, the sealing assembly 28 may provide a chamber for the expansion and contraction of the motor oil resulting from the heating and cooling of the motor 30 during operation. The sealing assembly 28 may include labyrinth chambers, bag chambers, mechanical seals, or some combination thereof.

The sensor 32 is typically disposed at the base of the ESP assembly 22 and collects real-time system and well bore parameters. Sensed parameters may include pressure, temperature, motor winding temperature, vibration, current leakage, discharge pressure, and so forth. The sensor 32 may provide feedback to the ESP control system 36 and alert users when one or sensed parameters fall outside of expected ranges.

Figure 2:
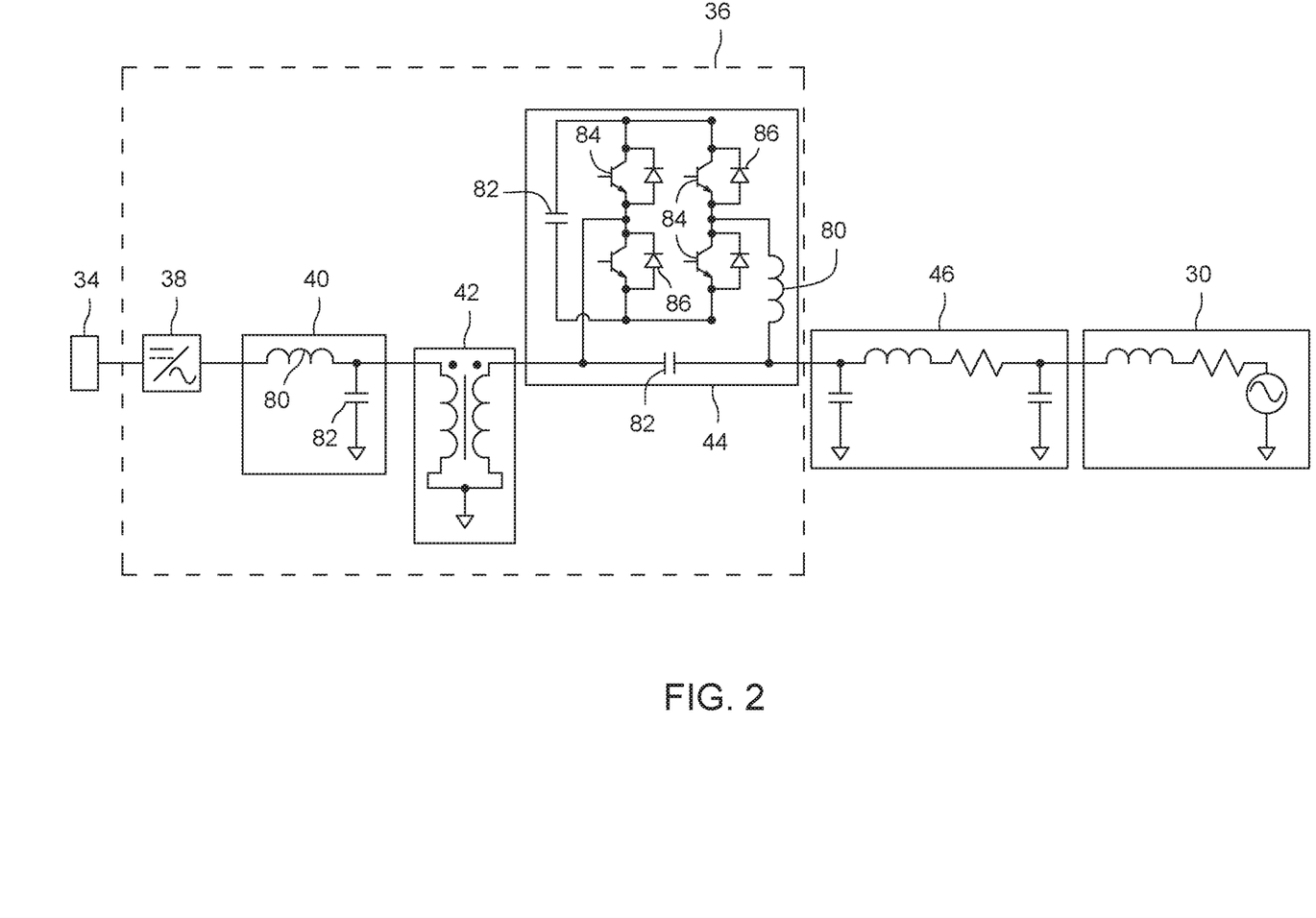
FIG. 2 is a wiring schematic of the electric submersible pump (ESP) control system in accordance with aspects of the present disclosure, where the wiring schematic includes a secondary variable frequency drive (VFD)

FIG. 2 is a wiring schematic of the ESP control system 36 shown in FIG. 1, in accordance with aspects of the present disclosure. In particular, in the illustrated embodiment, the ESP control system 36 includes the secondary VFD 44, as further described in detail below. As previously discussed, the main VFD 38 receives power from a power source 34 (e.g., utility grid, battery, generator, etc.), modifies the power, and outputs a power signal of the desired frequency and amplitude for driving the electric motor 30. The main VFD 38 may include power electronic switches, current measurement components, voltage measurements components, a process, or other components. The main VFD 38 may be installed on the main side of the transformer 42 and is programmed to operate the motor. The output from the main VFD 38 may then be filtered using the filter 40. In the embodiment shown, the filter 40 is a sine wave filter, however in other embodiments, the filter may be any low pass filter, or any other kind of filter. As shown in FIG. 2, the filter 40 may include inductors 80, capacitors 82, or other electrical components.

The output from the filter 40 is stepped up using the step up transformer 42. The step up transformer increases the voltage for efficient transmission through the cable 46 to the electric motor 30, which in some applications may as long as 1,000 to 10,000 feet. In certain situations, because of magnetic saturation, the transformer 42 may be limited in the voltage it can supply to the electric motor 30 at low frequencies.

In order to deal with the limitations of the transformer, in certain embodiments, the secondary VFD 44 may be disposed in series or parallel with the line, on the high voltage secondary side of the transformer 42, and configured to deliver full rated current for short periods of time (e.g., less than 1 minute). The secondary VFD 44 may interface with only one or all three phases of the system 36. As shown in FIG. 2, the secondary VFD 44 may include transistors 84 (e.g., IGBT or MOSFET), diodes 86, inductors 80, capacitors 82, and any number of other components. The secondary VFD 44 may also include power electronic switches, current measurement components, voltage measurement components, a processor, control circuitry, and the like. In addition to the single phase H-bridge topology shown in FIG. 2, the secondary VFD 44 may have a single phase half-bridge topology, or a polyphase half-bridge topology. In addition to the series topology, a parallel topology may be employed.

In some situations that require the electric motor 30 to operate at low frequency with high torque (e.g., startup of a motor, a temporarily seized pump, a transient load condition, etc.), magnetic saturation may prevent the main VFD 38 and the transformer 42 from providing sufficient voltage or magnetic flux to keep the electric motor 30 from stalling. Because the secondary VFD 44 is on the high voltage side of the transformer, the secondary VFD 44 can provide full rated current for a short period of time (e.g., one minute or less), thus supplementing the voltage of the main VFD 38 until the motor 30 reaches a high enough frequency for the main VFD 38 to drive the motor 30 on its own. As previously discussed, the power output by the ESP control system 36 is transmitted to the electric motor 30 via the cable 46.

Figure 3:
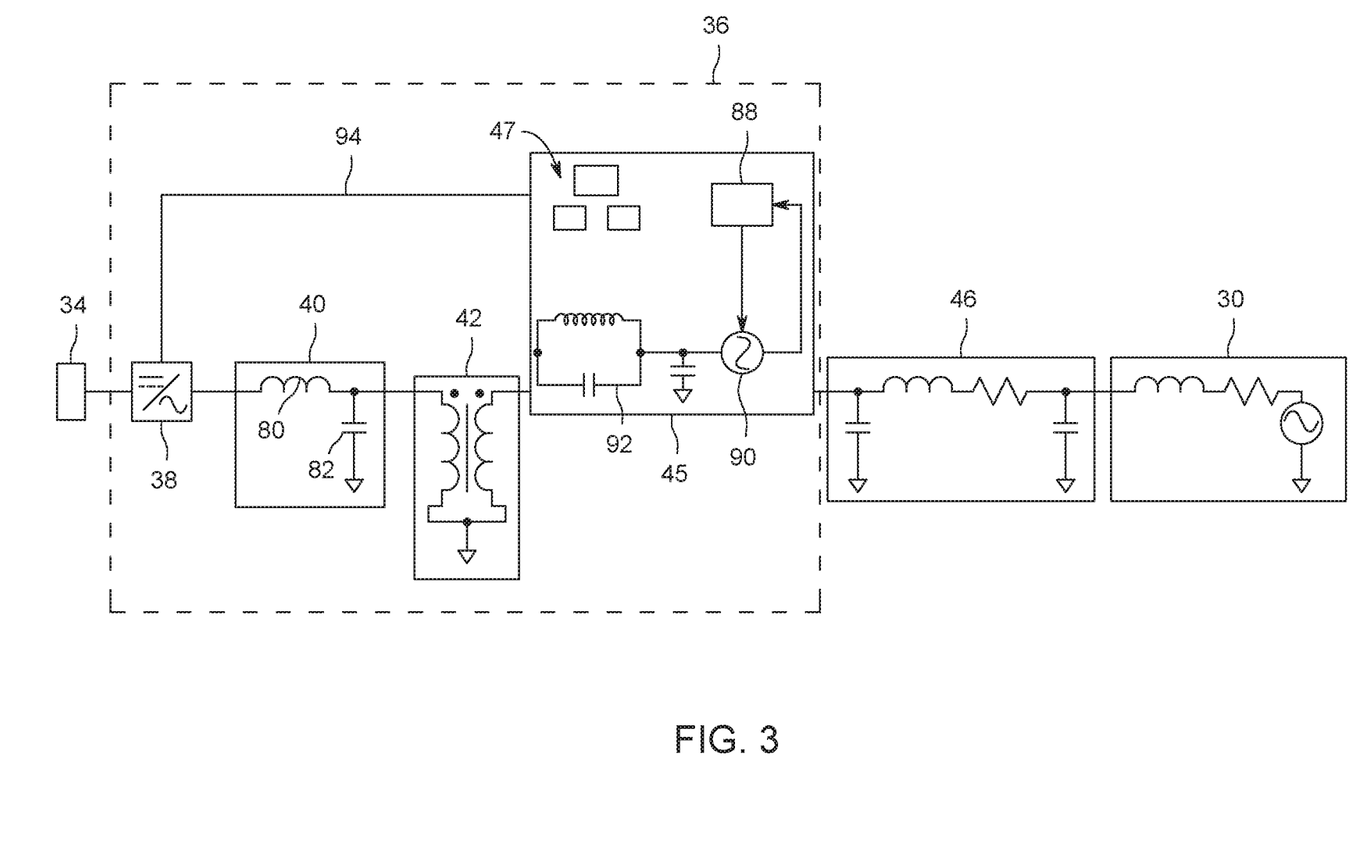
FIG. 3 is a wiring schematic of the electric submersible pump (ESP) control system in accordance with aspects of the present disclosure, where the wiring schematic includes a controller acting as a virtual encoder.

FIG. 3 is a wiring schematic of the ESP control system 36 shown in FIG. 1, in accordance with aspects of the present disclosure. In particular, in the illustrated embodiment, the ESP control system 36 includes a controller 45, as further described in detail below. In certain embodiments, the controller 45 of the ESP control system 36 may be replaced with the secondary VFD 44 to provide additional and/or alternative functionality. As previously discussed, the main VFD 38 receives power from a power source 34 (e.g., utility grid, battery, generator, etc.), modifies the power, and outputs a power signal of the desired frequency and amplitude for driving the electric motor 30. The output from the main VFD 38 may then be filtered using the filter 40, and the output from the filter 40 is stepped up using transformer 42. The controller 45 may include one or more voltage and current sensors 47 and interfaces with the transformer 42, thereby linking the variable frequency drive and the motor.

In certain embodiments, the controller 45 may include a digital signal processor 88, a signal injection module 90, and a band stop filter 92 associated with the signal injection module 90. The digital signal processor 88 serves as a signal interface module which receives electrical signals associated with an operating condition of the motor 30 from the one or more controller voltage and current sensors 47. The signal processor 88 may correlate the received electrical signals with a rotor position of the motor 30. In certain embodiments, the digital signal processor 88 may transmit signals corresponding to rotor position to the main VFD 38 via an output submodule of the signal interface module and a controller signal transmission link 94. In certain embodiments, the transmission link 94 may include cables configured to transmit analog or digital signals when the controller 45 acts as a virtual encoder or virtual resolver, and cables configured to transmit digital signals when the output from the signal interface module is in digital form. A wide variety of analog signal-carrying cables and digital signal-carrying cables are available commercially and are known to those of ordinary skill in the art. Alternatively, communication between the controller and the variable frequency drive may be done wirelessly by using radio communications.

In certain embodiments, the signal injection module 88 may be used to determine a rotor position of the motor 30 at low or zero rotor speeds. The band stop filter 92 associated with the signal injection module 88 may be configured to prevent controller probe signals generated by the signal injection module 88 from being transmitted via the power connection into allied components of the system, such as the transformer 42, the low pass filter 40, and main VFD 38.

As noted above, in certain embodiments, the ESP control system 36 may include the main VFD 38, the filter 40, the transformer 42, and the secondary VFD 44. In certain embodiments, the ESP control system 36 may include the controller 45 in lieu of the secondary VFD 44. Indeed, in certain embodiments of the present disclosure, such as within embodiments including the controller 45, the overall system efficiency may be improved by modifying information communicated to the main VFD 38, in order to drive the electric motor 30 operating point onto the maximum torque per Ampere (MTPA) curve. Further, in certain embodiments of the present disclosure, such as within embodiments including the secondary VFD 44, the overall system efficiency may be improved by utilizing the secondary VFD 44 to deliver (e.g., inject) correction signals into the system, in order to drive the electric motor 30 operating point onto the MTPA curve. These and other features of the present disclosure are described with respect to FIGS. 4-8.

Figure 4:
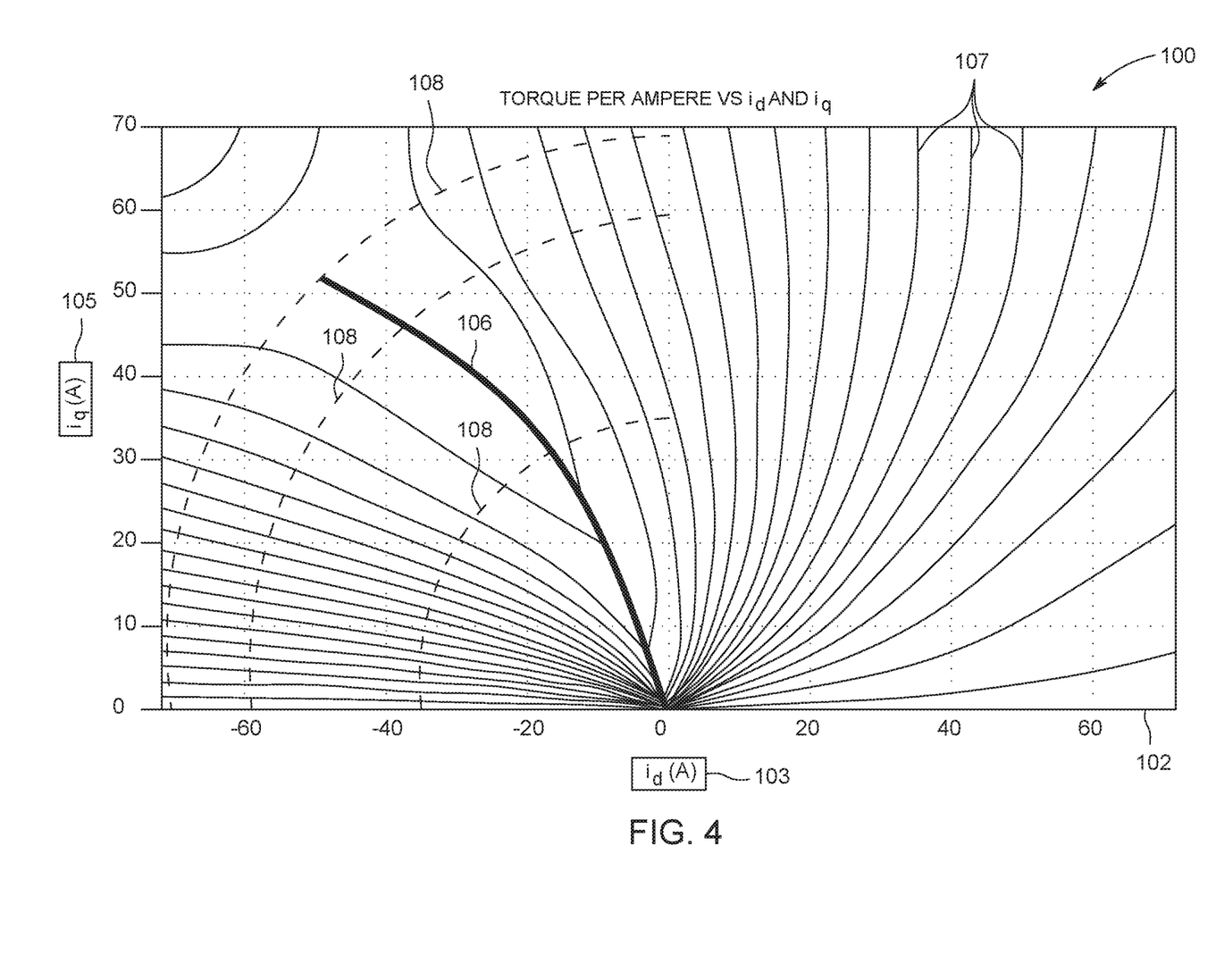
FIG. 4 is a plot illustrating the system of FIG. 1 operating along a Maximum Torque per Ampere (MTPA) curve.

FIG. 4 is a plot 100 illustrating the electric motor 30 of FIG. 1 operating along a Maximum Torque per Ampere (MTPA) curve 106. Specifically, the plot 100 is a topographical map illustrating an output power (e.g., torque 107) supplied by the electric motor 30 for an amount of current (e.g., ampere 103, 105) provided to the electric motor 30. In particular, the MTPA curve 106 on the plot 100 corresponds to maximum efficiency of the electric motor 30. In other words, operating the electric motor 30 along the MTPA curve 106 may result in a maximum amount of output power (e.g., torque 107) for a given amount of current (e.g., Ampere 103, 105) provided to the electric motor 30, as further described in detail below.

In the illustrated embodiment, the plot 100 depicts loci of constant output torque per Ampere 107 supplied by the electric motor 30 to a mechanical load for an amount of current (e.g., Ampere 103, 105) provided to the electric motor 30. Specifically, the X-axis 102 and the Y-axis 104 illustrate a direct ("d") component of current and a quadrature ("q") component of current, respectively. The "d" component of current 103 and the "q" component of current 105 may represent different phases of current. For example, the angle of the current with respect to voltage may change when the amount of the "d" component of current 103 is greater than the amount of the "q" component of current 105. In particular, the plot 100 illustrates a graphical depiction of the current locus 106 for maximum output torque. As noted above, the MTPA curve 106 is illustrative of a maximum efficiency of the electric motor 30 since the output power is maximized when torque is maximized at any given operating speed, and resistive losses are minimized by minimizing the magnitude of the motor current for the produced torque. In certain embodiments, the Loci 108 represent constant current magnitude in the motor windings.

In certain embodiments, it may be beneficial to drive the electrical motor 30 along the MTPA curve 106 to operate the system 10 efficiently. As noted above, power may be drawn from a power source 34 and provided to the electric motor 30 by the ESP control system 36. For example, the main VFD 38 of the ESP control system 36 may receive, filter, convert, and/or transform power received from the power source 34 to drive the electric motor 30. In certain embodiments, the controller 45 of the ESP control system 36 may interface with the power connection to link the main VFD 38 with the motor 30. In certain embodiments, the secondary VFD 44 of the ESP control system 36 may be configured to provide an additional voltage output to drive the electric motor 30. Accordingly, in situations where an operating point of the electric motor 30 is not along the MTPA curve 106, it may be beneficial to provide information and/or corrective signals to the main VFD 38 and/or the secondary VFD 44 to excite the electrical motor 30 in the desired manner. For example, in embodiments where the ESP control system 36 includes the controller 45, corrective information may be communicated to the main VFD 38 to drive the electric motor 30 onto the MTPA curve 106. As a further example, in embodiments where the ESP control system 36 includes the secondary VFD 44, the secondary VFD 44 may be utilized to inject correction signals that drive the electrical motor 30 onto the MTPA curve 106.

Figure 5:
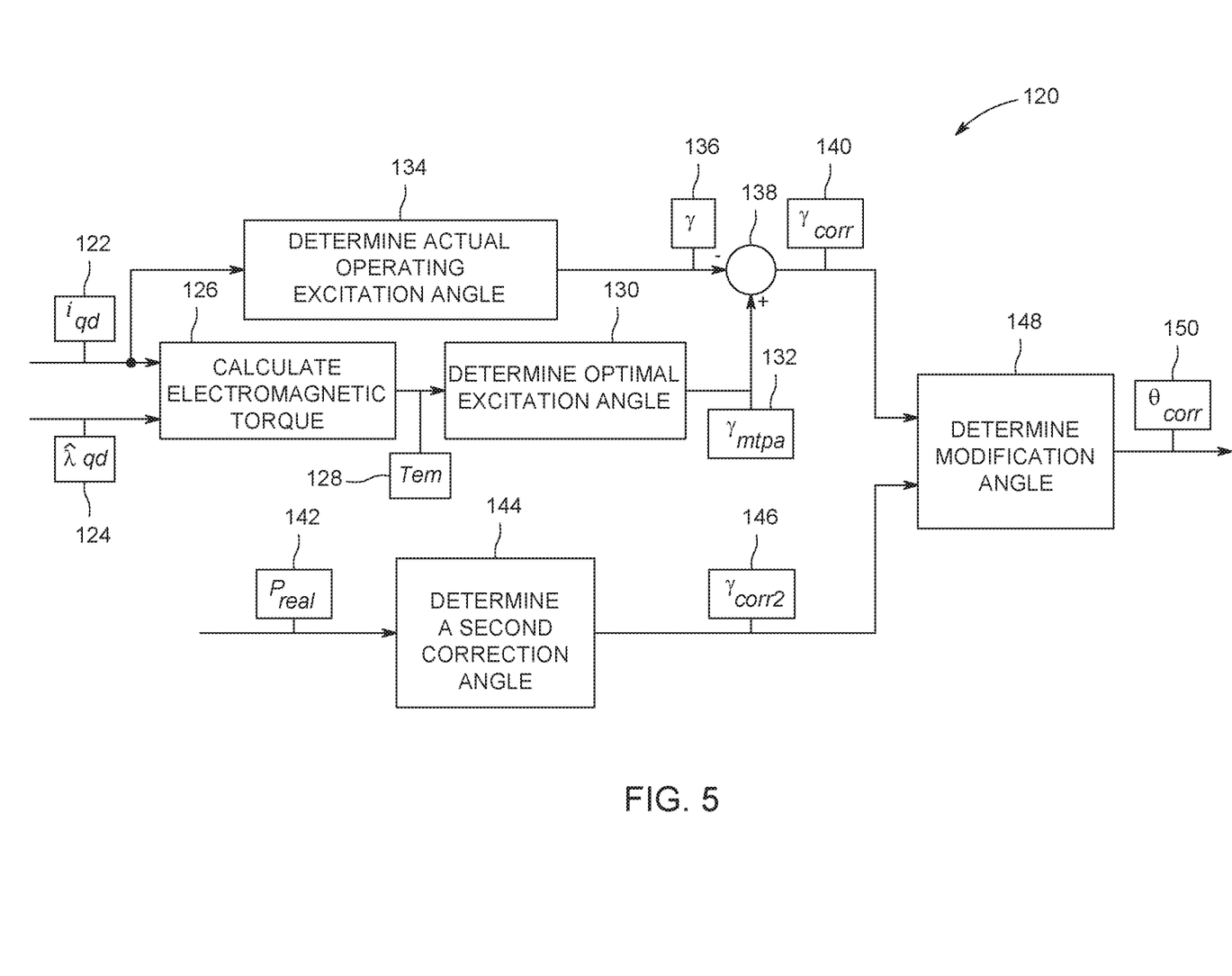
FIG. 5 is a flow chart for a process of determining a modification angle for a main variable frequency drive (VFD) in order to maximize the efficiency of a motor within the system of FIG. 3.
Figure 6:
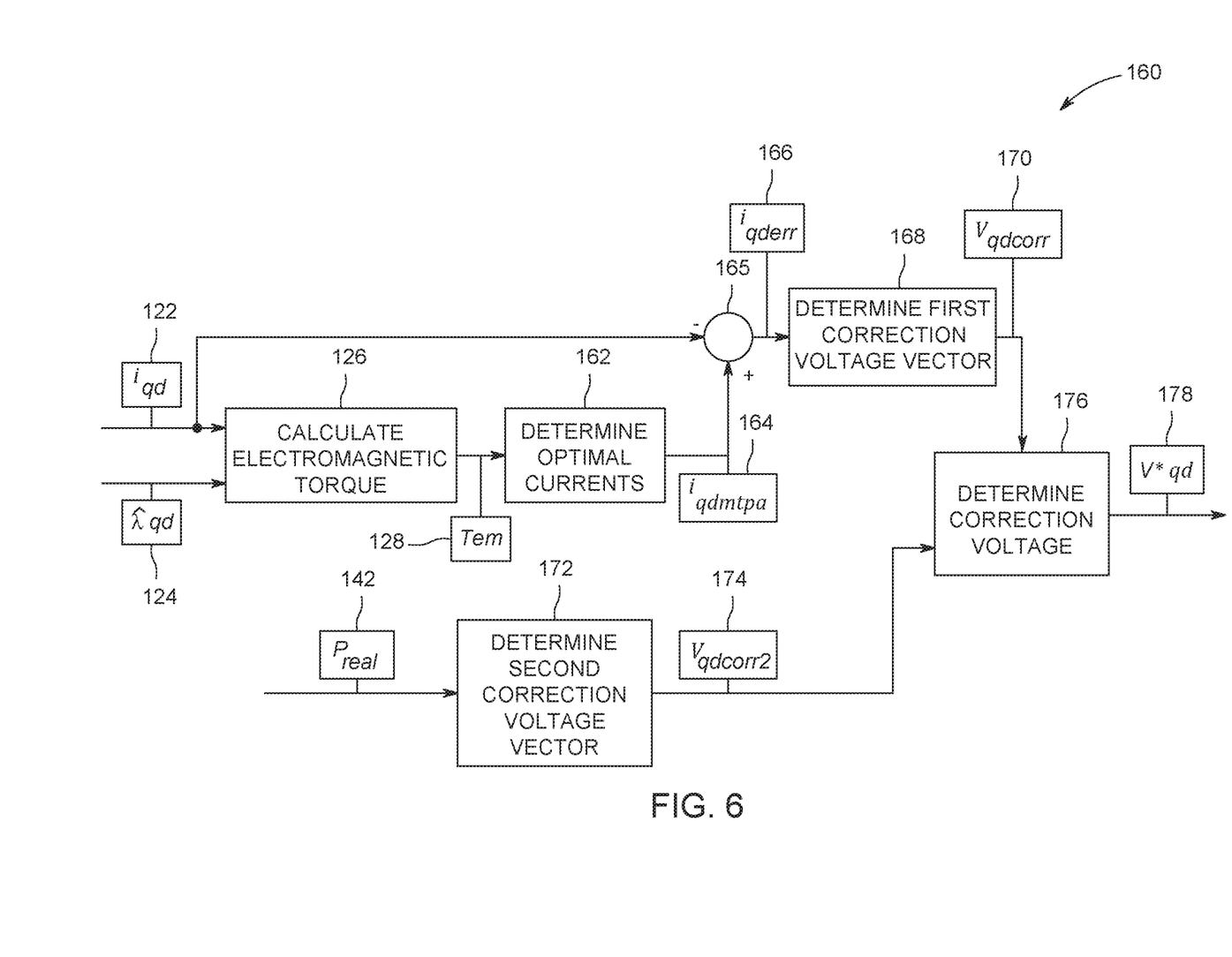
FIG. 6 is a flow chart for a process of determining a correction voltage for a secondary VFD in order to maximize the efficiency of a motor within the system of FIG. 2.
Figure 7:
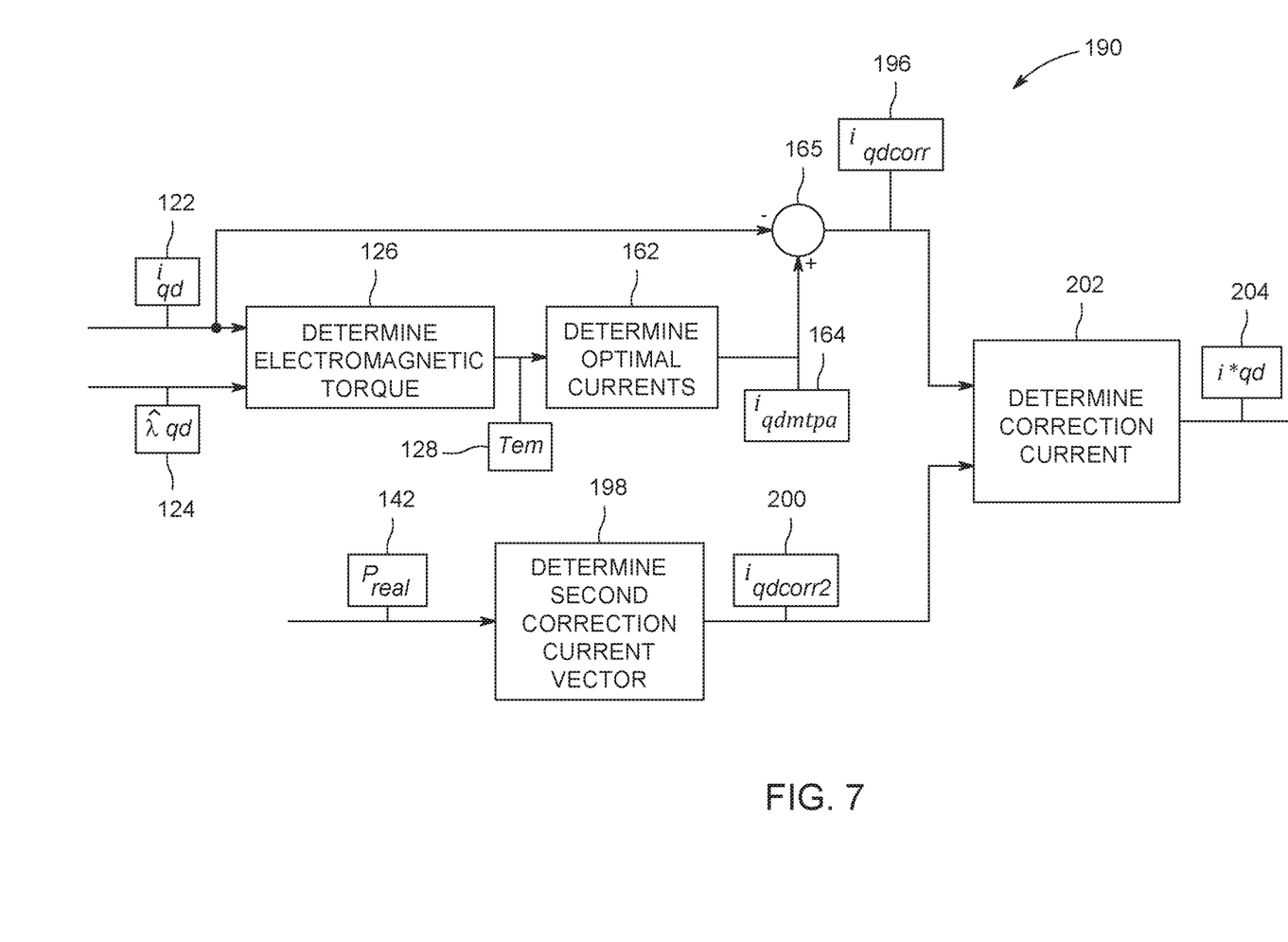
FIG. 7 is a flow chart for a process of determining a correction current for a secondary VFD in order to maximize the efficiency of a motor within the system of FIG. 2.

With the forgoing in mind, FIGS. 5-7 describe techniques for determining corrective information and/or correction signals for the main VFD 38 and/or the secondary VFD 44 that may be used to operate the electrical motor 30 in an efficient manner, such as along the MTPA curve 106.

FIG. 5 is a flow chart 120 for a process of determining a modification angle 150 that may be utilized by the ESP control system 36 for maximizing an efficiency of the electrical motor 30. In certain embodiments, the process may be executed by the controller 45 of the ESP control system 36. Specifically, in certain embodiments, the flow chart 120 may be utilized to determine the modification angle 150 that may be utilized as corrective information by the main VFD 38 of the ESP control system 36. The modification angle 150 may represent the angular error between the actual motor excitation and the desired motor excitation. In certain embodiments, the modification angle 150 may be added to angular information provided to the VFD 38. In the illustrated embodiment, the modification angle 150 may be provided directly to the main VFD 38. For example, the modification angle 150 may be combined with rotor angle information (e.g., position information) associated with the electrical motor 30, and may be utilized by the main VFD 38 to drive the electrical motor 30 in a desired manner, as further described below.

As noted above, the ESP control system 36 may be configured to provide an amount of current (e.g., Ampere 103, 105) to drive the electrical motor 30, and the electrical motor 30 may deliver an electromagnetic torque to a mechanical load. In certain embodiments, the electromagnetic torque delivered to the mechanical load by the motor 30 may be defined as:

$$T_{em} = \frac{N_p}{2}(\lambda_d i_q - \lambda_q i_d) \quad \text{(Equation 1)}$$

Further, in certain embodiments, the Torque per Ampere of current (TPA) supplied to the motor 30 by the ESP control system 36 may be defined as:

$$TPA = T_{em}(i_d^2 + i_q^2)^{-\frac{1}{2}} \quad \text{(Equation 2)}$$

Specifically, $T_{em}$ is the electromagnetic torque, $N_p$ is the number of magnetic poles within the electrical motor 30, $\lambda_q$ is the quadrature axis flux linkage, $\lambda_d$ is the direct axis flux linkage, $i_d$ is the direct axis current (e.g., d component of current 103), and $i_q$ is the quadrature axis current (e.g., q component of current 105). In certain embodiments, the above referenced equations may be utilized to determine corrective information and/or correction signals for the main VFD 38 and/or the secondary VFD 44 in order to drive the electrical motor 30 in a more efficient manner.

Referring to FIG. 5, the flow chart 120 includes utilizing a measured qd current 122 (e.g., $i_{qd}$) and estimated qd flux linkages 124 (e.g., $\lambda_{qd}$) to calculate an electromagnetic torque 128 (block 126). For example, the electromagnetic torque 128 (e.g., $T_{em}$) may be calculated utilizing Equation 1, as noted above. In certain embodiments, the flow chart 120 includes utilizing the calculated electromagnetic torque 128 to determine an optimal excitation angle 132 (e.g., $\gamma_{mtpa}$ 132) (block 130). In certain embodiments, the optimal excitation angle 132 may be determined via an algorithm, a look-up table (LUT), or other similar technique. Specifically, the optimal excitation angle 132 may be representative of the correct operating position of the motor 30, such as a rotor position of the electrical motor 30, that would provide the desired power output. Further, the flow chart 120 includes comparing the determined optimal excitation angle 132 to an actual operating excitation angle 136 (e.g., $\gamma$ 136) (block 134). In the illustrated embodiment, a current observer may be used to determine the operating excitation angle, but in other embodiments, the operating excitation angle may be a measured angle from a physical encoder, a resolver, or another type of observer. In certain embodiments, a summing junction 138 may be utilized to compare the optimal excitation angle 132 (e.g., $\gamma_{mtpa}$ 132) with the measured operating excitation angle 136 (e.g., $\gamma$ 136), and the resulting difference (if any) may be indicative of a first correction angle 140 (e.g., $\gamma_{corr}$ 140).

In certain embodiments, the flow chart 120 includes utilizing a measured power 142 (e.g., $P_{real}$ 142) to determine a second correction angle 146 (e.g., $\gamma_{corr2}$ 146) (block 144). In certain embodiments, the second correction angle 146 may be determined via a perturb and observe algorithm (PnO), as further described with respect to FIG. 8. In particular, the electromagnetic torque 128 (block 126) and the second correction angle 146 (block 144) may be calculated in parallel. Further, the flow chart 120 may include determining (block 148) a modification angle 150 (e.g., $\theta_{corr}$ 150) based on the first and second correction angles 140, 146 (e.g., $\gamma_{corr}$ 140 and $\gamma_{corr2}$ 146). For example, in certain embodiments, a VOTER algorithm may be utilized to determine how to modify the first and second correction angles 140, 146 in order to determine the modification angle 150. The VOTER algorithm may balance the first and second correction angles 140, 146, or may utilize one of the corrections angles (e.g., 140, 146) over the other. In certain embodiments, the determined modification angle 150 may be provided as corrective information to the main VFD 38. Indeed, by modifying the angle provided to the main VFD 38, the electric motor 30 may be configured to operate in a more efficient manner (e.g., along the MTPA curve 106).

FIG. 6 is a flow chart 160 for a process of determining a correction voltage 178 (e.g., $V^*_{qd}$ 178) that may be utilized by the ESP control system 36 for maximizing an efficiency of the electrical motor 30. In certain embodiments, the process may be executed by the secondary VFD 44 of the ESP control system 36. Specifically, in certain embodiments, the flow chart 160 may be utilized to determine the correction voltage 178 that may be injected into the system, via the secondary VFD 44 of the ESP control system 36, as correction signals for improving the efficiency and operation of the electric motor 30. In other embodiments, the flow chart 160 may directly transmit the correction voltage directly to the main VFD 38.

In certain embodiments, the flow chart 160 includes utilizing a measured qd current 122 (e.g., $i_{qd}$ 122) and an estimated qd flux linkages 124 (e.g., $\lambda_{qd}$) to calculate an electromagnetic torque 128 (e.g., $T_{em}$ 128) (block 126). For example, the electromagnetic torque 128 (e.g., $T_{em}$) may be calculated utilizing Equation 1, as noted above. In certain embodiments, the flow chart 160 includes utilizing the calculated electromagnetic torque 128 to determine an optimal current 164 (e.g., $i_{qdmtpa}$ 164) (block 162). In certain embodiments, the optimal current 164 may be determined via an algorithm, a look-up table (LUT), or other similar technique. Specifically, the optimal current 164 may be representative of a current that would produce the desired power output by the electric motor 30. Further, the flow chart 160 includes comparing the determined optimal current 164 (e.g., $i_{qdmtpa}$ 164) to the actual, measured qd current 122 (e.g., $i_{qd}$ 122). For example, in certain embodiments, a summing junction 165 may be utilized to compare the optimal current 164 (e.g., $i_{qdmtpa}$ 164) with the measured current 122 (e.g., $i_{qd}$ 122), and the resulting difference (if any) may be the current error difference 166 (e.g., $i_{qderr}$ 166). In certain embodiments, the current correction difference 166 (e.g., $i_{qderr}$) may be utilized to determine a first correction voltage vector 170 (e.g., $V_{qdcorr}$ 170) (block 168). In certain embodiments, the first correction voltage vector 170 may be determined with a compensator, such as a proportional plus integral or lead-lag compensator structures.

In certain embodiments, the flow chart 160 includes utilizing a measured power 142 (e.g., $P_{real}$ 142) to determine a second correction voltage vector 174 (e.g., $V_{qdcorr2}$ 174) (block 172). In certain embodiments, the second correction voltage vector 174 (e.g., $V_{qdcorr2}$ 174) may be determined via a perturb and observe algorithm (PnO), as further described with respect to FIG. 8. In particular, the electromagnetic torque 128 (block 126) and the second correction voltage vector 174 (block 172) may be calculated in parallel. Further, the flow chart 160 may include determining a correction voltage 178 (e.g., $V^*_{qd}$ 178) based on the first and second correction voltage vectors 170, 174 (e.g., $V_{qdcorr}$ 170 and $V_{qdcorr2}$ 174). For example, in certain embodiments, a VOTER algorithm may be utilized to determine how to modify the first and second correction voltage vectors 170, 174 in order to determine the correction voltage 176. The VOTER algorithm may balance the first and second correction voltage vectors 170, 174, or may utilize one of the correction voltage vectors (e.g., 170, 174) over the other. In certain embodiments, the determined correction voltage 178 (e.g., $V^*_{qd}$) may be provided as corrective signals to the secondary VFD 44. Indeed, by modifying the voltage provided to the secondary VFD 44, the electric motor 30 may be configured to operate in a more efficient manner (e.g., along the MTPA curve 106).

FIG. 7 is a flow chart 190 for a process of determining a correction current 204 (e.g., $i^*_{qd}$ 204) that may be utilized by the ESP control system 36 for maximizing an efficiency of the electrical motor 30. Specifically, in certain embodiments, the flow chart 190 may be utilized to determine the correction current 204 that may be injected into the system, via the secondary VFD 44 of the ESP control system 36, as correction signals for improving the efficiency and operation of the electric motor 30. In other embodiments, the flow chart 190 may directly transmit the correction current or a correction torque directly to the main VFD 38.

In certain embodiments, the flow chart 190 includes utilizing a measured qd current 122 (e.g., $i_{qd}$ 122) and an estimated qd flux linkages 124 (e.g., $\lambda_{qd}$) to calculate an electromagnetic torque 128 (e.g., $T_{em}$ 128) (block 126). For example, the electromagnetic torque 128 (e.g., $T_{em}$ 128) may be calculated utilizing Equation 1, as noted above. In certain embodiments, the flow chart 190 includes utilizing the calculated electromagnetic torque 128 to determine an optimal current 164 (e.g., $i_{qdmtpa}$ 164) (block 162). In certain embodiments, the optimal current 164 may be determined via an algorithm, a look-up table (LUT), or other similar technique. Specifically, the optimal current 164 may be representative of a current that would produce the desired power output by the electric motor 30. Further, the flow chart 190 includes comparing the determined optimal current 164 (e.g., $i_{qdmtpa}$ 164) to the actual, measured qd current 122 (e.g., $i_{qd}$ 122). For example, in certain embodiments, a summing junction 165 may be utilized to compare the optimal current 164 (e.g., $i_{qdmtpa}$ 164) with the measured current 122 (e.g., $i_{qd}$ 122), and the resulting difference (if any) may be a first current correction vector 196 (e.g., $i_{qderr}$ 196).

In certain embodiments, the flow chart 190 includes utilizing a measured power 142 (e.g., $P_{real}$ 142) to determine a second current correction vector 200 (e.g., $i_{qdcorr2}$ 200) (block 198). In certain embodiments, the second current correction vector 200 (e.g., $i_{qdcorr2}$ 200) may be determined via a perturb and observe algorithm (PnO), as further described with respect to FIG. 8. In particular, the electromagnetic torque 128 (block 126) and the second current correction vector 200 (block 198) may be calculated in parallel. Further, the flow chart 190 may include determining a correction current 204 (e.g., $i^*_{qd}$ 204) based on the first and second current correction vectors 196, 200 (e.g., $i_{qdcorr}$ 196 and $i_{qdcorr2}$ 200). For example, in certain embodiments, a VOTER algorithm may be utilized to determine how to modify the first and second current correction vectors 196, 200 in order to determine the correction current 204. The VOTER algorithm may balance the first and second current correction vectors 196, 200, or may utilize one of the current correction vectors (e.g., 196, 200) over the other. In certain embodiments, the determined current correction 204 (e.g., $i^*_{qd}$) may be provided as one or more corrective signals to the secondary VFD 44 (block 202). Indeed, by modifying the current provided by the secondary VFD 44, the electric motor 30 may be configured to operate in a more efficient manner (e.g., along the MTPA curve 106).

Figure 8:
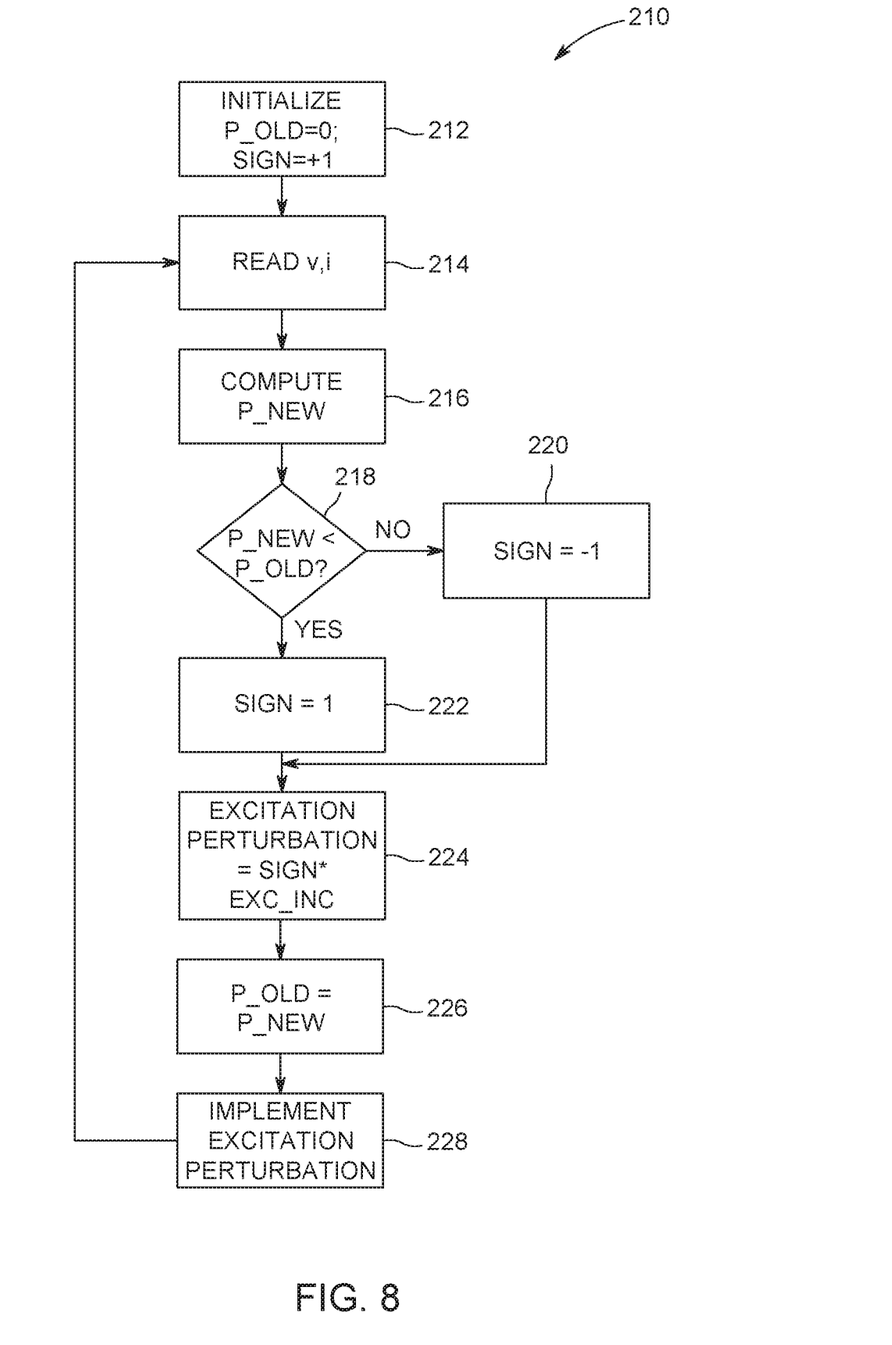
FIG. 8 is an exemplary flow chart of a perturb and observe algorithm (PnO), which is utilized within the flow charts of FIGS. 5-7.

FIG. 8 is an exemplary flow chart 210 of a perturb and observe algorithm (PnO), which may be utilized within the flow charts of FIGS. 5-7. In particular, the PnO algorithm may be a method implemented by a processor of the system (e.g., controller 45, the secondary VFD 44, the main VFD 38, etc.). In general, the processor may adjust the voltage by a small amount and measure the resulting power. If a power increase is detected, the processor of the system may be configured to make further adjustments in that direction until the resulting power no longer increases. In this manner, the PnO algorithm may be utilized to determine a correction angle 146 (e.g., $\gamma_{corr2}$ 146), a correction voltage vector 174 (e.g., $V_{qdcorr2}$ 174), and/or a correction current vector 200 (e.g., $i_{qdcorr2}$ 200). In the illustrated embodiment, an exemplary PnO algorithm is described in further detail. However, it should be noted that any algorithm that optimized the power output of a machine may be utilized and implemented with the embodiments described above.

In certain embodiments, the flow chart 210 begins with initializing the power variable (e.g., P_OLD=0) and the sign variable (e.g., SIGN=+1) (block 212). Further, the flow chart 210 includes reading a voltage and current measurement (e.g., READ v,i) (block 214), and utilizing the measurements to compute a new power output (e.g., COMPUTE P_NEW) (block 216). In certain embodiments, the flow chart 210 includes determining whether the new calculated power output is less than the previously calculated power output or the initial power output value (e.g., P_NEW<P_OLD?) (block 218). If the calculated power output is greater than the previously calculated power output or the initial power output value, the sign variable is adjusted (e.g., SIGN=−1) (block 220), and the excitation perturbation is calculated (e.g., EXCITATION PERTURBATION=SIGN*EXC_INC) (block 224). If the calculated power output is less than the previously calculated power output or the initial power output value, the sign variable is adjusted (e.g., SIGN=1) (block 222), and the excitation perturbation is calculated (e.g., EXCITATION PERTURBATION=SIGN*EXC_INC) (block 224). Further, the flow chart 210 includes resetting the power variable (e.g., P_OLD=P_NEW) (block 226), and implementing the excitation perturbation (block 228). If necessary, the flow chart 210 includes repeating the steps by reading the voltage and current measurements (e.g., READ v, i) (block 214).

Technical effects of the invention include optimizing an efficiency of an electric motor 30 (e.g., an induction motor or a permanent magnet motor) utilized with variable frequency drives (VFDs). Specifically, the electrical motor 30 may be utilized to drive electric submersible pumps (ESPs) within oil and gas applications to pump fluid from a reservoir and to the surface. In certain embodiments, the main VFD 38 may receive, filter, convert, and/or transform power received from a power source to drive the electric motor. Further, in certain embodiments, the secondary VFD 44 may be disposed on the high-voltage side of the transformer 42 and may be configured to deliver full-rated current for a short period of time (e.g., one minute or less) when the electric motor 30 requires more voltage than the transformer 42 can support. Specifically, the present embodiments are targeted toward improving the efficiency of the electric motor 30 by modifying information and/or signals communicated to the main VFD 38 and/or the secondary VFD 44.

Specifically, in certain embodiments, the Maximum Torque per Ampere (MTPA) curve 106 may be an indication of the operating efficiency of the electrical motor 30. Accordingly, certain embodiments of the present disclosure relate to improving the overall system efficiency by modifying information communicated to the main VFD 38, in order to drive the electric motor 30 operating point onto the MTPA curve 106. Further, certain embodiments of the present disclosure relate to improving the overall system efficiency by utilizing the secondary VFD to deliver correction signals into the system, in order to drive the motor 30 operating point onto the MTPA curve 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for driving an electric machine, the system comprising:
  a main drive configured to receive power from a power source and output a variable frequency and a variable amplitude AC voltage to the electric machine; and
  a secondary drive configured to interface with the main drive, wherein the secondary drive is configured to provide a supplemental voltage or current to the electric machine in addition to the variable amplitude AC voltage from the main drive, and wherein the secondary drive is configured to:

receive one or more electrical signals associated with an operating condition of the electric machine from one or more sensors disposed between the electric machine and the main drive;

determine correction information based on the received electrical signals and based on a desired operating condition of the electric machine; and implement the correction information, wherein the correction information corresponds to operating commands configured to implement the desired operating condition of the electric machine.

2. The system of claim 1, comprising a transformer comprising a low voltage side and a high voltage side of the transformer.

3. The system of claim 2, wherein the main drive is coupled to the low voltage side of the transformer and the secondary drive is coupled to the high voltage side of the transformer.

4. The system of claim 1, wherein the correction information comprises a correction voltage command implemented by the secondary drive to obtain the desired operating condition of the electric machine.

5. The system of claim 4, wherein the correction voltage command is determined based at least in part on a difference between the operating condition of the electric machine and a desired optimal voltage.

6. The system of claim 1, wherein the correction information comprises a correction current command implemented by the secondary drive to obtain the desired operating condition of the electric machine.

7. The system of claim 6, wherein the correction current command is determined based at least in part on a difference between the operating condition of the electric machine and a desired optimal current.

8. The system of claim 1, wherein the electric machine is a synchronous motor or a permanent magnet motor.

9. A method of optimizing an efficiency of an electric machine, comprising:

monitoring one or more current operational values of the electric machine within an electric submersible pump (ESP) system via a control system having a main drive and a secondary drive, wherein the secondary drive is configured to interface with the main drive;

receiving power from a power source via the main drive;

outputting from the main drive a variable amplitude AC voltage;

providing a supplemental voltage or current to the electric machine in addition to the variable amplitude AC voltage via the secondary drive;

receiving the one or more current operational values of the electric machine associated with an operating condition of the electric machine from one or more sensors disposed between the electric machine and the control system;

determining correction information based on the one or more current operational values of the electric machine and based on one or more desired operational values of the electric machine; and transmitting the correction information to the main drive or the secondary drive of the control system, wherein the correction information corresponds to operating commands configured to implement a desired operating condition of the electric machine.

10. The method of claim 9, comprising transmitting the correction information to the main drive, and wherein the correction information comprises a modification angle corresponding to a rotor position of the electric machine.

11. The method of claim 9, comprising transmitting the correction information to the main drive, wherein the correction information comprises operating commands configured to modify a variable frequency or a variable amplitude AC voltage output by the main drive.

12. The method of claim 9, comprising transmitting the correction information to the secondary drive, and wherein the correction information comprises a correction voltage command or a correction current command corresponding to the one or more desired operational values of the electric machine.

* * * * *